United States Patent
Han et al.

(10) Patent No.: US 9,213,129 B2
(45) Date of Patent: Dec. 15, 2015

(54) BRIGHTNESS ENHANCING FILM AND BACKLIGHT UNIT COMPRISING THE SAME

(71) Applicant: KOLON INDUSTRIES, INC, Gwacheon-si, Gyeonggi-do (KR)

(72) Inventors: A Reum Han, Seoul (KR); Jeong Yeol Moon, Yongin-si (KR)

(73) Assignee: KOLON INDUSTRIES, INC., Gwacheon-si (KR)

(*) Notice: Subject to any disclaimer, the term of this patent is extended or adjusted under 35 U.S.C. 154(b) by 0 days.

(21) Appl. No.: 14/410,447

(22) PCT Filed: Jun. 27, 2013

(86) PCT No.: PCT/KR2013/005725
§ 371 (c)(1),
(2) Date: Dec. 22, 2014

(87) PCT Pub. No.: WO2014/003468
PCT Pub. Date: Jan. 3, 2014

(65) Prior Publication Data
US 2015/0323717 A1 Nov. 12, 2015

(30) Foreign Application Priority Data

Jun. 28, 2012 (KR) .................. 10-2012-0070158
Jun. 27, 2013 (KR) .................. 10-2013-0074692

(51) Int. Cl.
*G02B 5/08* (2006.01)
*G02B 5/26* (2006.01)
*G02B 5/30* (2006.01)

(52) U.S. Cl.
CPC ............... *G02B 5/26* (2013.01); *G02B 5/0841* (2013.01); *G02B 5/305* (2013.01)

(58) Field of Classification Search
CPC .......... G02B 5/3016; G02B 5/08; G02B 5/00; G02B 5/282; G02B 5/287; G02B 1/111; G02B 6/0026; G02B 6/0055; G02B 5/0841; G02B 5/3041; G02B 5/305; G02F 1/13357; B32B 2250/05; B32B 2307/416
USPC ........ 359/359, 487.05, 584, 850, 883; 349/98
See application file for complete search history.

(56) References Cited

U.S. PATENT DOCUMENTS

| | | |
|---|---|---|
| 2003/0071947 A1 | 4/2003 | Shiraogawa et al. |
| 2005/0270439 A1 | 12/2005 | Weber et al. |
| 2006/0204681 A1 | 9/2006 | Kim et al. |
| 2007/0128419 A1 | 6/2007 | Osada et al. |
| 2008/0106675 A1* | 5/2008 | Uesaka ................ G02B 5/3016 349/98 |
| 2010/0021731 A1 | 1/2010 | Nomura et al. |

OTHER PUBLICATIONS

International Searching Authority, International Search Report for PCT/KR2013/005725 dated Sep. 26, 2013.

* cited by examiner

*Primary Examiner* — Euncha Cherry
(74) *Attorney, Agent, or Firm* — Sughrue Mion, PLLC (57) ABSTRACT

Disclosed is a brightness enhancing film, including a multi-layered thin film wherein a plurality of first thin film layers which are optically anisotropic and a plurality of second thin film layers which are optically isotropic are alternately stacked, the multilayered thin film including a first wavelength reflection region which reflects a wavelength of 160~451 nm, a second wavelength reflection region which reflects a wavelength of 451~836 nm, and a third wavelength reflection region which reflects a wavelength of 836~1040 nm, and a thickness of each of the first and second thin film layers in the first and second wavelength reflection regions is linearly increased from the short wavelength reflection side toward the long wavelength reflection side, and a thickness of each of the first and second thin film layers in the third wavelength reflection region is nonlinearly increased from the short wavelength reflection side toward the long wavelength reflection side.

10 Claims, 2 Drawing Sheets

BRIGHTNESS ENHANCING FILM AND BACKLIGHT UNIT COMPRISING THE SAME

CROSS REFERENCE TO RELATED APPLICATIONS

This application is a National Stage of International Application No. PCT/KR2013/005725 filed Jun. 27, 2013, claiming priority based on Korean Patent Application Nos. 10-2012-0070158, filed Jun. 28, 2012 and 10-2013-0074692, filed Jun. 27, 2013, the contents of all of which are incorporated herein by reference in their entirety.

TECHNICAL FIELD

The present invention relates to a brightness enhancing film for use in displays, and to a backlight unit comprising the same.

BACKGROUND ART

Typically, in order to achieve high brightness and light uniformity, a backlight unit for a liquid crystal display includes a reflective film, a diffusion film, a prism film, a brightness enhancing film, etc.

In particular, a brightness enhancing film is effective at increasing light efficiency and brightness of a liquid crystal display, and specifically, a brightness enhancing film is an optical film which enables only light that vibrates in any one direction among natural light rays incident while vibrating in a variety of directions to pass threrethrough and light that vibrates in the other directions to be reflected.

Figure 1:
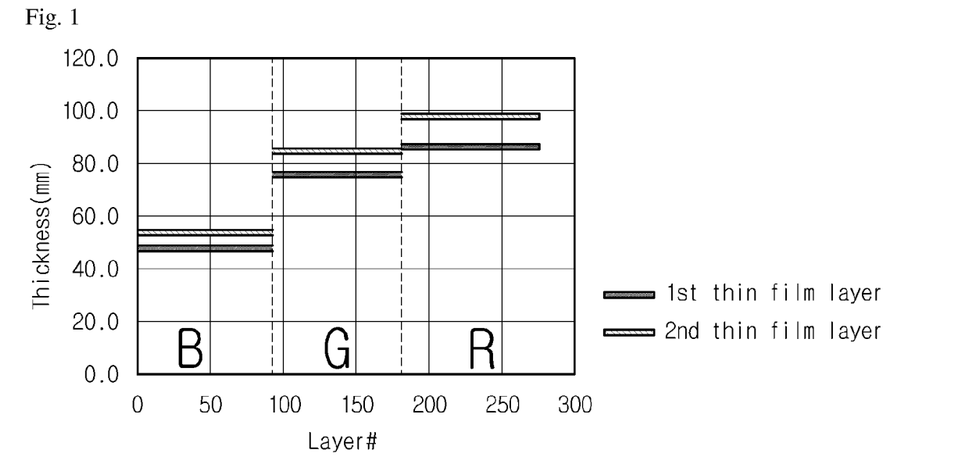
FIG. 1 is a graph illustrating a thickness increment of a conventional brightness enhancing film.

Generally, a brightness enhancing film enables 50% of incident light to pass therethrough and the remaining 50% to be reflected. A conventional brightness enhancing film is configured such that the thicknesses of thin film layers in predetermined regions of a multilayered thin film for reflecting wavelengths similar to those of incident light are designed to be the same (FIG. 1), but such a brightness enhancing film is problematic because reflective light cannot be thoroughly reflected.

SUMMARY OF INVENTION

Technical Problem

Accordingly, the present invention is intended to provide a brightness enhancing film, which may thoroughly reflect reflective light so as to achieve a complete black.

In addition, the present invention is intended to provide a backlight unit comprising the brightness enhancing film.

Solution to Problem

According to a preferred first embodiment of the present invention, a brightness enhancing film is provided, which comprises a multilayered thin film configured such that a plurality of first thin film layers which are optically anisotropic and a plurality of second thin film layers which are optically isotropic are alternately stacked, wherein the multilayered thin film includes a first wavelength reflection region which reflects a wavelength of 160~451 nm, a second wavelength reflection region which reflects a wavelength of 451~836 nm, and a third wavelength reflection region which reflects a wavelength of 836~1040 nm, a thickness of each of the first thin film layers and the second thin film layers, which constitute the first wavelength reflection region, is linearly increased from a short wavelength reflection side toward a long wavelength reflection side, a thickness of each of the first thin film layers and the second thin film layers, which constitute the second wavelength reflection region, is linearly increased from a short wavelength reflection side toward a long wavelength reflection side, and a thickness of each of the first thin film layers and the second thin film layers, which constitute the third wavelength reflection region, is nonlinearly increased from a short wavelength reflection side toward a long wavelength reflection side.

In the above embodiment, the first wavelength reflection region, the second wavelength reflection region, and the third wavelength reflection region may be sequentially positioned toward the uppermost layer from the lowermost layer of the multilayered thin film, and based on the total number of layers of the multilayered thin film, the number of thin film layers of the first wavelength reflection region may be 30~35%, the number of thin film layers of the second wavelength reflection region may be 30~35%, and the number of thin film layers of the third wavelength reflection region may be 30~35%.

In the above embodiment, in the first thin film layers, a thickness increment of the first thin film layers in the first wavelength reflection region may be 0.30~0.50, and a thickness increment of the first thin film layers in the second wavelength reflection region may be 0.50~0.70

In the above embodiment, in the second thin film layers, a thickness increment of the second thin film layers in the first wavelength reflection region may be 0.36~0.56, and a thickness increment of the second thin film layers in the second wavelength reflection region may be 0.58~0.78.

In the above embodiment, in the first thin film layers, a thickness of each of the first thin film layers in the first wavelength reflection region may be 22~61 nm, a thickness of each of the first thin film layers in the second wavelength reflection region may be 62~115 nm, and a thickness of each of the first thin film layers in the third wavelength reflection region may be determined by the following Equation 1, and may be 116~143 nm.

$$y_x = ax^2 + bx + c \quad \text{Equation 1}$$

In Equation 1, a is a real number of −0.0043~−0.0023, b is a real number of 1.75~1.95, c is a real number of −110~−90, x is an integer of 1 or more which shows a thin film layer, and $y_x$ is a thickness of a thin film layer corresponding to an $x^{th}$ layer.

In the above embodiment, in the second thin film layers, a thickness of each of the second thin film layers in the first wavelength reflection region may be 40~69 nm, a thickness of each of the second thin film layers in the second wavelength reflection region may be 70~130 nm, and a thickness of each of the second thin film layers in the third wavelength reflection region may be determined by the following Equation 1, and may be 132~162 nm.

$$y_x = ax^2 + bx + c \quad \text{Equation 1}$$

In Equation 1, a is a real number of −0.0043~−0.0023, b is a real number of 1.75~1.95, c is a real number of −110~−90, x is an integer of 1 or more which shows a thin film layer, and $y_x$ is a thickness of a thin film layer corresponding to an $x^{th}$ layer.

In the above embodiment, the first thin film layers may include a resin having 80 mol % or more of an ethylene naphthalate repeating unit.

In the above embodiment, the first thin film layers may include a resin having 80~100 mol % of an ethylene naphthalate repeating unit and 0~20 mol % of an ethylene terephthalate repeating unit.

In the above embodiment, the second thin film layers may include a resin having 10~60 mol % of an ethylene naphthalate repeating unit.

In the above embodiment, the second thin film layers may include a resin having 10~60 mol % of an ethylene naphthalate repeating unit and 40~90 mol % of an ethylene terephthalate repeating unit.

Advantageous Effects of Invention

According to the present invention, a brightness enhancing film can reflect the entire wavelength range of light which is reflected after having been incident on the brightness enhancing film, thus increasing brightness relative to Reference (backlight unit+diffusion sheet+prism sheet+panel), and achieving a complete black, resulting in increased polarization efficiency. Although a conventional brightness enhancing film is configured such that thin film layers thereof have the same thickness per wavelength reflection region and thus the total thickness of the film may increase to reflect the wide wavelength range, the brightness enhancing film according to the present invention is configured such that thin film layers thereof have a thickness increment which gradually increases, thus reducing the total thickness of the film.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Hereinafter, a detailed description will be given of the present invention.

According to the present invention, a brightness enhancing film comprising a multilayered thin film is controlled in terms of a thickness increment, making it possible to reflect the entire wavelength range of light which is reflected after having been incident on the brightness enhancing film. This brightness enhancing film is provided in the form of a multilayered thin film configured such that a plurality of first thin film layers which are optically anisotropic and a plurality of second thin film layers which are optically isotropic are alternately stacked, wherein the multilayered thin film includes a first wavelength reflection region which reflects a wavelength of 160~451 nm, a second wavelength reflection region which reflects a wavelength of 451~836 nm, and a third wavelength reflection region which reflects a wavelength of 836~1040 nm. The thickness of each of the first thin film layers and the second thin film layers, which constitute the first wavelength reflection region, is linearly increased from the short wavelength reflection side toward the long wavelength reflection side, and the thickness of each of the first thin film layers and the second thin film layers, which constitute the second wavelength reflection region, is linearly increased from the short wavelength reflection side toward the long wavelength reflection side. Also, the thickness of each of the first thin film layers and the second thin film layers, which constitute the third wavelength reflection region, is nonlinearly increased from the short wavelength reflection side toward the long wavelength reflection side.

Figure 2:
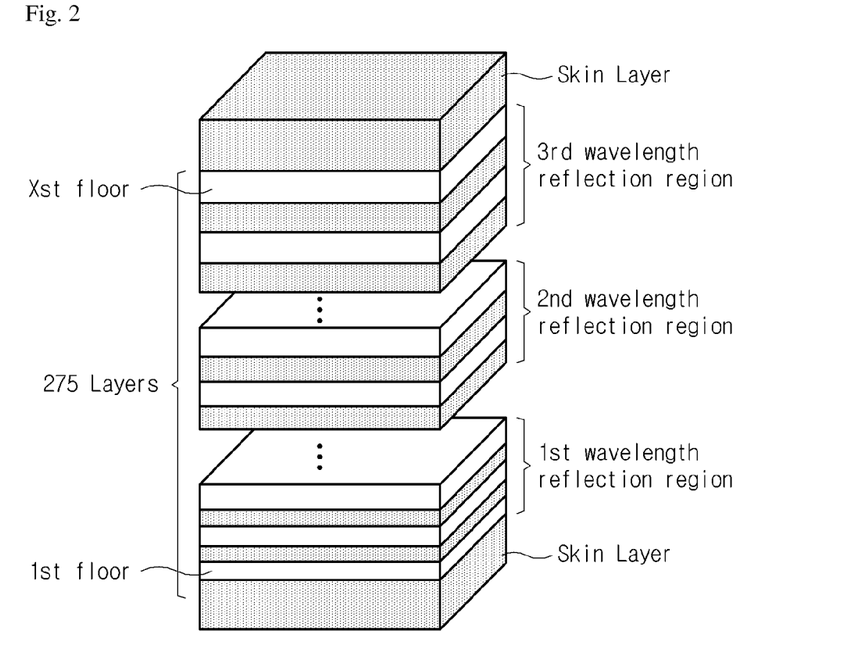
FIG. 2 is a view illustrating a brightness enhancing film according to the present invention configured such that a plurality of first thin film layers and a plurality of second thin film layers are alternately stacked, wherein the brightness enhancing film includes a first wavelength reflection region, a second wavelength reflection region and a third wavelength reflection region.

According to the present invention, the brightness enhancing film is provided in the form of a multilayered thin film including the first thin film layers which are optically anisotropic and the second thin film layers which are optically isotropic and formed on one surface of each of the first thin film layers, wherein the first thin film layers and the second thin film layers are alternately stacked (FIG. 2).

In the present invention, the term "optically isotropic" means that the refractive indexes related to all the axes in the plane of the thin film layer are substantially the same, and the term "optically anisotropic" means that the refractive indexes related to the axes in the plane of the thin film layer are substantially different.

In the brightness enhancing film according to the present invention, the multilayered thin film may include, depending on the wavelength range of light which may be reflected after having been incident on the film, a first wavelength reflection region, a second wavelength reflection region and a third wavelength reflection region. As such, the first wavelength reflection region, the second wavelength reflection region and the third wavelength reflection region are sequentially positioned toward the uppermost layer from the lowermost layer of the multilayered thin film of the brightness enhancing film (FIG. 2).

Further, a skin layer may be provided on the uppermost surface and/or the lowermost surface of the multilayered thin film of the brightness enhancing film according to the present invention, and the skin layer may be formed of polyethylene naphthalate (PEN), polycarbonate (PC) or glycol-modified polyethylene terephthalate (PETG).

The first wavelength reflection region indicates a portion of the multilayered thin film, which reflects a wavelength of 160~451 nm. The proportion of the number of thin film layers corresponding to the first wavelength reflection region may be 30~35% based on the total number of layers of the multilayered thin film. If the proportion of the number of thin film layers corresponding to the first wavelength reflection region is less than 30% or exceeds 35%, polarization efficiency near the wavelength of 450 nm may be undesirably decreased to 60% or less. However, the maximum wavelength which is reflected in the first wavelength reflection region and the minimum wavelength which is reflected in the second wavelength reflection region may overlap with each other or may be the same as each other. If a difference between the maximum wavelength which is reflected in the first wavelength reflection region and the minimum wavelength which is reflected in the second wavelength reflection region is 10 nm or more, polarization efficiency and brightness may be drastically lowered in the corresponding wavelength range. In contrast, if the maximum wavelength which is reflected in the first wavelength reflection region and the minimum wavelength which is reflected in the second wavelength reflection region overlap with each other or are the same as each other, polarization efficiency and brightness may increase.

As mentioned above, in the first wavelength reflection region, the thickness increment of the first thin film layers and the second thin film layers is linear. That is, as the number of layers of the multilayered thin film increases, the layer thickness is linearly increased.

The second wavelength reflection region is a portion of the multilayered thin film, which reflects a wavelength of 451~836 nm. The proportion of the number of thin film layers corresponding to the second wavelength reflection region may be 30~35% based on the total number of layers of the multilayered thin film. If the proportion of the number of thin film layers corresponding to the second wavelength reflection region is less than 30% or exceeds 35%, polarization efficiency near the wavelengths of 450 nm and 836 nm may be undesirably decreased to 60% or less. However, the maximum wavelength which is reflected in the second wavelength reflection region and the minimum wavelength which is reflected in the third wavelength reflection region may overlap with each other or may be the same as each other. If a difference between the maximum wavelength which is reflected in the second wavelength reflection region and the minimum wavelength which is reflected in the third wavelength reflection region is 10 nm or more, polarization efficiency and brightness may be drastically lowered in the corresponding wavelength range. In contrast, if the maximum wavelength which is reflected in the second wavelength reflection region and the minimum wavelength which is reflected in the third wavelength reflection region overlap with each other or are the same as each other, polarization efficiency and brightness properties may increase.

As mentioned above, the thickness increment of the first thin film layers and the second thin film layers in the second wavelength reflection region is linear. That is, as the number of layers of the multilayered thin film increases, the layer thickness is linearly increased.

The third wavelength reflection region indicates a portion of the multilayered thin film, which reflects a wavelength of 836~1040 nm. The proportion of the number of thin film layers corresponding to the third wavelength reflection region may be 30~35% based on the total number of layers of the multilayered thin film. If the proportion of the number of thin film layers corresponding to the third wavelength reflection region is less than 30% or exceeds 35%, the polarization efficiency near the wavelengths of 836 nm and 1040 nm may be undesirably decreased to 60% or less. In the case where the maximum wavelength of the second wavelength reflection region and the minimum wavelength of the third wavelength reflection region overlap with each other or are the same as each other, polarization efficiency and brightness may increase.

As mentioned above, the thickness of the first thin film layers and the second thin film layers in the third wavelength reflection region is nonlinearly increased.

According to an embodiment of the present invention, when the number of layers of the multilayered thin film of the brightness enhancing film is 300, the proportion of the first wavelength reflection region is 33%, the proportion of the second wavelength reflection region is 33%, and the proportion of the third wavelength reflection region is 34%. In this case, when the lowermost layer of the multilayered thin film of the brightness enhancing film is set to the first layer and the uppermost layer of the multilayered thin film is set to the $300^{th}$ layer, the first layer to the $99^{th}$ layer correspond to the first wavelength reflection region, the $100^{th}$ layer to the $198^{th}$ layer correspond to the second wavelength reflection region, and the $199^{th}$ layer to the $300^{th}$ layer correspond to the third wavelength reflection region.

In the brightness enhancing film according to the present invention, the first thin film layers are optically anisotropic.

In the case of the first thin film layers, the thickness of each of the first thin film layers in the first wavelength reflection region is 22~61 nm, the thickness of each of the first thin film layers in the second wavelength reflection region is 62~115 nm, and the thickness of each of the first thin film layers in the third wavelength reflection region is 116~143 nm. As such, if the thickness of each of the first thin film layers in the first wavelength reflection region is less than 22 nm or exceeds 61 nm under conditions of the number of layers being decided, the thickness interval between the layers may increase and thus reflection efficiency may decrease due to the layers therebetween, undesirably lowering polarization efficiency and shifting color coordinates. Also, if the thickness of each of the first thin film layers in the second wavelength reflection region is less than 62 nm or exceeds 115 nm, the thickness interval between the layers may increase, and thus reflection efficiency may decrease due to the layers therebetween, undesirably lowering polarization efficiency and shifting color coordinates. Furthermore, if the thickness of each of the first thin film layers in the third wavelength reflection region is less than 116 nm or exceeds 143 nm, the thickness interval between the layers may increase, and thus reflection efficiency may decrease due to the layers therebetween, undesirably lowering polarization efficiency and shifting color coordinates. As such, the thickness of the first thin film layers in the third wavelength reflection region may be determined by the following Equation 1.

$$y_x = ax^2 + bx + c \qquad \text{Equation 1}$$

Figure 4:
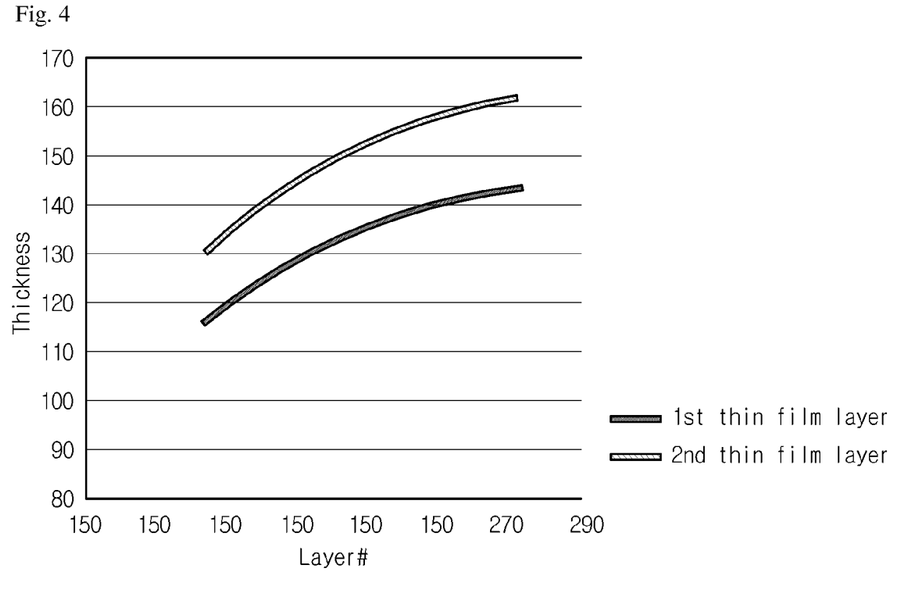
FIG. 4 is a graph illustrating the changes in thickness of the first and second thin film layers in the third wavelength reflection region, in the brightness enhancing film according to the present invention.

In Equation 1, a is a real number of −0.0043~−0.0023, b is a real number of 1.75~1.95, c is a real number of −110~−90, x is an integer of 1 or more which shows the thin film layer, and $y_x$ is the thickness of the thin film layer corresponding to the $x^{th}$ layer (FIG. 4). The changes in thickness of the thin film layers as represented by Equation 1 are referred to as "thickness gradient profile."

The thickness increment of the first thin film layers may vary depending on the type of wavelength reflection region, and in the first and second wavelength reflection regions, the thickness increment thereof may be linear, and in the third wavelength reflection region, the thickness increment thereof may be nonlinear.

Specifically, the thickness increment of the first thin film layers may be 0.30~0.50 in the first wavelength reflection region, and may be 0.50~0.70 in the second wavelength reflection region.

In the brightness enhancing film according to the present invention, the second thin film layers are optically isotropic.

In the case of the second thin film layers, the thickness of each of the second thin film layers in the first wavelength reflection region is 40~69 nm, the thickness of each of the second thin film layers in the second wavelength reflection region is 70~130 nm, and the thickness of each of the second thin film layers in the third wavelength reflection region is 132~162 nm. As such, if the thickness of each of the second thin film layers in the first wavelength reflection region is less than 40 nm or exceeds 69 nm under conditions of the number of layers being decided, the thickness interval between the layers may increase and thus reflection efficiency may decrease due to the layers therebetween, undesirably lowering polarization efficiency and shifting color coordinates. Further, if the thickness of each of the second thin film layers in the second wavelength reflection region is less than 70 nm or exceeds 130 nm, the thickness interval between the layers may increase and thus reflection efficiency may decrease due to the layers therebetween, undesirably lowering polarization efficiency and shifting color coordinates. Furthermore, if the thickness of each of the second thin film layers in the third wavelength reflection region is less than 132 nm or exceeds 162 nm, the thickness interval between the layers may increase and thus reflection efficiency may decrease due to the layers therebetween, undesirably lowering polarization efficiency and shifting color coordinates. As such, the thickness of the second thin film layers in the third wavelength reflection region may be determined by the following Equation 1.

$$y_x = ax^2 + bx + c \qquad \text{Equation 1}$$

In Equation 1, a is a real number of −0.0043~−0.0023, b is a real number of 1.75~1.95, c is a real number of −110~−90, x is an integer of 1 or more which shows the thin film layer, and $y_x$ is the thickness of the thin film layer corresponding to the $x^{th}$ layer (FIG. 4). The changes in thickness of the thin film layers as represented by Equation 1 are referred to as "thickness gradient profile."

The thickness increment of the second thin film layers may vary depending on the type of wavelength reflection region, and the thickness increment thereof may be linear in the first and second wavelength reflection regions, and may be nonlinear in the third wavelength reflection region.

Specifically, the thickness increment of the second thin film layers is 0.36~0.56 in the first wavelength reflection region and is 0.58~0.78 in the second wavelength reflection region, and is nonlinearly increased in the third wavelength reflection region.

In the brightness enhancing film according to the present invention, the first thin film layers may include a resin having 80~100 mol % of an ethylene naphthalate repeating unit and 0~20 mol % of an ethylene terephthalate repeating unit. Preferably, the first thin film layers may include a resin having 90~100 mol % of an ethylene naphthalate repeating unit and 0~10 mol % of an ethylene terephthalate repeating unit.

The resin for the first thin film layers may be prepared by polycondensing dimethylcarboxylic naphthalate (NDC) and ethylene glycol (EG); or dimethylcarboxylic naphthalate (NDC), ethylene glycol (EG) and terephthalic acid (TPA).

The second thin film layers may include a resin having 10~60 mol % of an ethylene naphthalate repeating unit, and preferably includes a resin having 10~60 mol % of an ethylene naphthalate repeating unit and 40~90 mol % of an ethylene terephthalate repeating unit. More preferably, useful is a resin having 40~60 mol % of an ethylene naphthalate repeating unit and 40~60 mol % of an ethylene terephthalate repeating unit.

The resin for the second thin film layers may be prepared by polycondensing dimethylcarboxylic naphthalate (NDC), ethylene glycol (EG) and terephthalic acid (TPA).

The multilayered thin film is configured such that repeating units each having a first thin film layer and a second thin film layer are stacked, that is, first and second thin film layers are alternately stacked, but the present invention is not limited thereto. For example, the repeating unit may be formed by disposing at least one thin film layer different from the first and second thin film layers at any position of the repeating unit. Alternatively, a repeating unit including the first thin film layer and the second thin film layer, and at least one repeating unit having the stacking form different from the above repeating unit may be regularly or irregularly stacked.

The brightness enhancing film may be manufactured using any process, such as extrusion drawing, deposition, application, etc., and is preferably manufactured by extruding the first and second thin film layers into a multilayered film which is then drawn. The manufacturing process using extrusion drawing is briefly described below. First, dimethylcarboxylic naphthalate (NDC), ethylene glycol (EG) and terephthalic acid (TPA) are placed at a predetermined ratio in a polymerization reactor, and then polycondensed, thus preparing a polymer resin for first thin film layers and a polymer resin for second thin film layers. The prepared polymer resins are dried so as to be dewatered, and co-extruded using an extruder with a multilayer feed block, thus forming a multilayered extrusion film wherein the first and second thin film layers are alternately stacked. The multilayered extrusion film is continuously drawn using a uniaxial drawing machine under conditions of a predetermined temperature, drawing ratio, and drawing rate, and wound, thereby obtaining a brightness enhancing film.

The brightness enhancing film thus obtained has increased polarization efficiency, may be decreased in the total thickness, and may reflect the entire wavelength range of light which is reflected after having been incident on the brightness enhancing film.

MODE FOR THE INVENTION

A better understanding of the present invention may be obtained through the following examples which are set forth to illustrate, but are not to be construed as limiting, the present invention.

In the following examples, brightness enhancing films including first thin film layers and second thin film layers as shown in Tables 1 and 2 below were manufactured.

Example 1

Dimethylcarboxylic naphthalate (NDC) and ethylene glycol (EG) were polycondensed using a polymerization reactor, thus preparing a first polymer resin for first thin film layers, having 100 mol % of an ethylene naphthalate repeating unit. Also, dimethylcarboxylic naphthalate (NDC), ethylene glycol (EG) and terephthalic acid (TPA) were polycondensed, thus preparing a second polymer resin for second thin film layers, having 40 mol % of an ethylene terephthalate repeating unit and 60 mol % of an ethylene naphthalate repeating unit. The first polymer resin was dewatered in an oven at 100° C. for 24 hr, and the second polymer resin was dewatered in an oven at 70° C. for 48 hr. The first polymer resin and the second polymer resin were respectively extruded at a rate of 30 kg/hr using a multilayer feed block, finally forming a multilayered extrusion film having 277 layers. The multilayered extrusion film was obtained by applying a skin layer on each of the upper and lower surfaces of a multilayered thin film having 275 layers and then performing extrusion. Each skin layer had a thickness corresponding to 10% of the total thickness of the multilayered thin film, and was formed by extruding polyethylene naphthalate (PEN).

The thickness of each second thin film layer made of the second polymer resin was 1.124 times the thickness of each first thin film layer made of the first polymer resin. The extrusion process was performed so as to form different layer thicknesses at respective regions, and specifically, each first thin film layer was extruded to a thickness of 22~61 nm in the first wavelength reflection region, to a thickness of 62~115 nm in the second wavelength reflection region, and to a thickness of 116~143 nm in the third wavelength reflection region. Each second thin film layer was extruded to a thickness of 40~69 nm in the first wavelength reflection region, to a thickness of 70~130 nm in the second wavelength reflection region, and to a thickness of 132~162 nm in the third wavelength reflection region. The proportions of the number of thin film layers of the first, second and third wavelength reflection regions were 33%, 33% and 34%, respectively, based on the total number of layers of the multilayered thin film.

The multilayered extrusion film was uniaxially drawn at a drawing ratio of 5 times at 130° C., and then thermally cured in an oven at 230° C. for 30 sec.

Both surfaces of the drawn multilayered film were coated with an acrylic UV curable adhesive, laminated with a diffusion film (LD102) available from KOLON, and then irradiated with UV light at 500 mj/cm², thereby manufacturing a brightness enhancing film.

Figure 3:
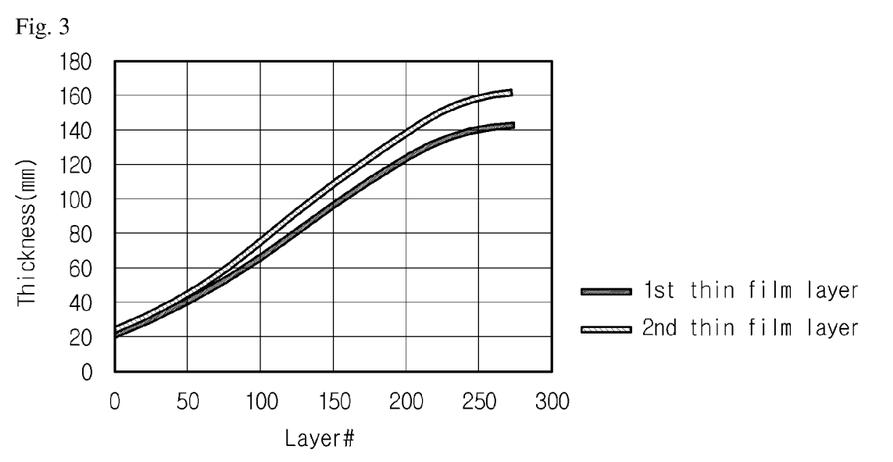
FIG. 3 is a graph illustrating a thickness increment of the brightness enhancing film according to an embodiment of the present invention.

The thickness gradient profile of the brightness enhancing film of Example 1 is illustrated in FIG. 3.

Example 2

A brightness enhancing film was manufactured in the same manner as in Example 1, with the exception that, as shown in Tables 1 and 2 below, the proportions of the number of thin film layers of the first, second and third wavelength reflection regions were 30%, 35% and 35%, respectively, based on the total number of layers of the multilayered thin film.

Examples 3 and 4

Brightness enhancing films were manufactured in the same manner as in Example 1, with the exception that, as shown in Tables 1 and 2 below, the thickness gradient profile of the third wavelength reflection region was differently set.

Comparative Example 1

A brightness enhancing film was manufactured in the same manner as in Example 1, with the exception that, as shown in Tables 1 and 2 below, the proportions of the number of thin film layers of the first, second and third wavelength reflection regions were 20%, 40% and 40%, respectively, based on the total number of layers of the multilayered thin film.

Comparative Example 2

A brightness enhancing film was manufactured in the same manner as in Example 1, with the exception that, as shown in Tables 1 and 2 below, the thickness gradient profile of the first thin film layers in respective wavelength reflection regions was set to 0.31 and the thickness gradient profile of the second thin film layers in respective wavelength reflection regions was set to 0.35. Specifically, the manufactured brightness enhancing film was configured such that all of the thickness gradient profiles of the first and second thin film layers in the first, second and third wavelength reflection regions were linear.

Comparative Example 3

A brightness enhancing film was manufactured in the same manner as in Example 1, with the exception that, as shown in Tables 1 and 2 below, the thicknesses of the first and second thin film layers were differently set.

Measurement of Properties

The brightness enhancing films of the above examples and comparative examples were measured in terms of brightness relative to Reference, polarization efficiency, color coordinates, and polarization efficiency depending on the wavelength using the following methods. The results are given in Table 3 below.

(1) Brightness Relative to Reference (%)

As optical films, a diffusion film (XC210, available from KOLON) and a prism film (LC217, available from KOLON) were provided on a 21.5 inch backlight unit, after which the brightness enhancing film and a 21.5 inch TN-LCD panel were sequentially stacked thereon, followed by applying a power of 24 V and measuring brightness using a brightness meter (BM-7, available from TOPCON, JAPAN). Reference (Tref.) was brightness before stacking of the brightness enhancing film, and brightness relative to Reference was represented by the following equation, wherein Tp is the brightness after stacking of the brightness enhancing film.

$$\text{Brightness relative to Reference}(\%) = (Tp - Tref.)/Tref. \times 100$$

(2) Polarization Efficiency (%)

The brightness measured as above was substituted into the following equation and calculated. In the equation, Tp is the brightness when the brightness enhancing film is parallel to the polarizer of the TN-LCD panel, and Tc is the brightness when the brightness enhancing film is perpendicular to the polarizer of the TN-LCD panel.

$$\text{Polarization efficiency}(\%) = \sqrt{(Tp-Tc)/(Tp+Tc)} \times 100$$

(3) Color Coordinates (CIE)

The color coordinates CIE were measured using the above brightness meter (BM-7, available from).

(4) Polarization Efficiency (%) Depending on Wavelength

The extrusion film was drawn, and then the polarization efficiency (%) thereof was measured depending on the wavelength using Rets-100.

TABLE 1

|  | 1st Thin film layers | | | | | | | | |
|---|---|---|---|---|---|---|---|---|---|
|  | 1st wavelength reflection region (160~451 nm wavelength reflection) | | | 2nd wavelength reflection region (451~836 nm wavelength reflection) | | | 3rd wavelength reflection region (836~1040 nm wavelength reflection) | | |
|  | Proportion of number of thin film layers (%) | Thick. profile | Thick. (nm) | Proportion of number of thin film layers (%) | Thick. profile | Thick. (nm) | Proportion of number of thin film layers (%) | Thick. profile | Thick. (nm) |
| Ex. 1 | 33 | 0.43 | 22~61 | 33 | 0.57 | 62~115 | 34 | a = −0.0029, b = 1.6401, c = −87.617 | 116~143 |
| Ex. 2 | 30 | 0.43 | 22~61 | 35 | 0.57 | 62~115 | 35 | a = −0.0029, b = 1.6401, c = −87.617 | 116~143 |

TABLE 1-continued

| | 1st Thin film layers ||||||||
| | 1st wavelength reflection region (160~451 nm wavelength reflection) ||| 2nd wavelength reflection region (451~836 nm wavelength reflection) ||| 3rd wavelength reflection region (836~1040 nm wavelength reflection) |||
| | Proportion of number of thin film layers (%) | Thick. profile | Thick. (nm) | Proportion of number of thin film layers (%) | Thick. profile | Thick. (nm) | Proportion of number of thin film layers (%) | Thick. profile | Thick. (nm) |
|---|---|---|---|---|---|---|---|---|---|
| Ex. 3 | 33 | 0.30 | 22~61 | 33 | 0.50 | 62~115 | 34 | a = −0.0019, b = 1.5401, c = −77.00 | 116~143 |
| Ex. 4 | 33 | 0.50 | 22~61 | 33 | 0.70 | 62~115 | 34 | a = −0.0039, b = 1.7501, c = −97.00 | 116~143 |
| C. Ex. 1 | 20 | 0.43 | 22~61 | 40 | 0.57 | 62~115 | 40 | a = −0.0029, b = 1.6401, c = −87.617 | 116~143 |
| C. Ex. 2 | 33 | 0.31 | 22~61 | 33 | 0.31 | 62~115 | 34 | Linear thick. gradient profile 0.31 | 116~143 |
| C. Ex. 3 | 33 | 0.43 | 15~81 | 33 | 0.57 | 50~130 | 34 | a = −0.0029, b = 1.6401, c = −87.617 | 120~150 |

Note 1) The thickness of the first thin film layers in the third wavelength reflection region is determined by Equation 1 below, wherein a, b and c are as shown in Table 1, x is an integer of 1 or more which shows the thin film layer, and $y_x$ is the thickness of the thin film layer corresponding to the $x^{th}$ layer.

$$y_x = ax^2 + bx + c \quad \text{Equation 1}$$

TABLE 2

| | 2nd Thin film layers ||||||||
| | 1st wavelength reflection region (160~451 nm wavelength reflection) ||| 2nd wavelength reflection region (451~836 nm wavelength reflection) ||| 3rd wavelength reflection region (836~1040 nm wavelength reflection) |||
| | Proportion of number of thin film layers (%) | Thick. profile | Thick. (nm) | Proportion of number of thin film layers (%) | Thick. profile | Thick. (nm) | Proportion of number of thin film layers (%) | Thick. profile | Thick. (nm) |
|---|---|---|---|---|---|---|---|---|---|
| Ex. 1 | 33 | 0.49 | 40~69 | 33 | 0.66 | 70~130 | 34 | a = −0.0033, b = 1.8536, c = −100.24 | 132~162 |
| Ex. 2 | 30 | 0.49 | 40~69 | 35 | 0.66 | 70~130 | 35 | a = −0.0033, b = 1.8536, c = −100.24 | 132~162 |
| Ex. 3 | 33 | 0.35 | 40~69 | 35 | 0.58 | 70~130 | 35 | a = −0.0023, b = 1.7501, c = −90.00 | 132~162 |
| Ex. 4 | 33 | 0.56 | 40~69 | 35 | 0.78 | 70~130 | 35 | a = −0.0043, b = 1.9501, c = −110.00 | 132~162 |
| C. Ex. 1 | 20 | 0.49 | 40~69 | 40 | 0.66 | 70~130 | 40 | a = −0.0033, b = 1.8536, c = −100.24 | 132~162 |
| C. Ex. 2 | 33 | 0.35 | 40~69 | 33 | 0.35 | 70~130 | 34 | Linear thick. gradient profile 0.35 | 132~162 |
| C. Ex. 3 | 33 | 0.49 | 20~80 | 33 | 0.66 | 50~150 | 34 | a = −0.0033, b = 1.8536, c = −100.24 | 120~180 |

Note 2) The thickness of the second thin film layers in the third wavelength reflection region is determined by Equation 1 below, wherein a, b and c are as shown in Table 2, x is an integer of 1 or more which shows the thin film layer, and $y_x$ is the thickness of the thin film layer corresponding to the $x^{th}$ layer.

$$y_x = ax^2 + bx + c \qquad \text{Equation 1}$$

TABLE 3

|  | Brightness relative to Reference (%) | Polarization Efficiency (%) | Color co-ordinates X | Color co-ordinates Y | Wavelength range at which polarization efficiency is 90% or more (nm) |
|---|---|---|---|---|---|
| Ex. 1 | 36 | 92 | 0.312 | 0.341 | 160~1040 |
| Ex. 2 | 32 | 92 | 0.312 | 0.341 | 160~1040 |
| Ex. 3 | 33 | 90 | 0.311 | 0.340 | 160~1040 |
| Ex. 4 | 32 | 90 | 0.313 | 0.342 | 160~1040 |
| C. Ex. 1 | 28 | 88 | 0.308 | 0.332 | 300~1040 |
| C. Ex. 2 | 27 | 88 | 0.307 | 0.335 | 310~920 |
| C. Ex. 3 | 20 | 80 | 0.306 | 0.334 | 310~450, 500~580 |

As is apparent from Table 3 showing the results of measurement of the properties of the brightness enhancing films of the above examples and comparative examples, in the cases where the number of thin film layers of the multilayered thin film of the brightness enhancing film is not appropriately distributed per wavelength reflection region (Comparative Example 1), or where the thickness gradient profile in the third wavelength reflection region is linear (Comparative Example 2), or where the thickness of each of the first and second thin film layers per wavelength reflection region falls outside of the proper range (Comparative Example 3), the brightness of the brightness enhancing film may decrease, or the polarization efficiency of 90% or more cannot be exhibited, and the color coordinates may be shifted to red or blue.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A brightness enhancing film, comprising a multilayered thin film configured such that a plurality of first thin film layers which are optically anisotropic and a plurality of second thin film layers which are optically isotropic are alternately stacked,
wherein the multilayered thin film includes a first wavelength reflection region which reflects a wavelength of 160~451 nm, a second wavelength reflection region which reflects a wavelength of 451~836 nm, and a third wavelength reflection region which reflects a wavelength of 836~1040 nm,
a thickness of each of the first thin film layers and the second thin film layers, which constitute the first wavelength reflection region, is linearly increased from a short wavelength reflection side toward a long wavelength reflection side,
a thickness of each of the first thin film layers and the second thin film layers, which constitute the second wavelength reflection region, is linearly increased from a short wavelength reflection side toward a long wavelength reflection side, and
a thickness of each of the first thin film layers and the second thin film layers, which constitute the third wavelength reflection region, is nonlinearly increased from a short wavelength reflection side toward a long wavelength reflection side.

2. The brightness enhancing film of claim 1, wherein the first wavelength reflection region, the second wavelength reflection region, and the third wavelength reflection region are sequentially positioned toward an uppermost layer from a lowermost layer of the multilayered thin film, and
based on a total number of layers of the multilayered thin film, the number of thin film layers of the first wavelength reflection region is 30~35%, the number of thin film layers of the second wavelength reflection region is 30~35%, and the number of thin film layers of the third wavelength reflection region is 30~35%.

3. The brightness enhancing film of claim 1, wherein, in the first thin film layers,
a thickness increment of the first thin film layers in the first wavelength reflection region is 0.30~0.50, and
a thickness increment of the first thin film layers in the second wavelength reflection region is 0.50~0.70.

4. The brightness enhancing film of claim 1, wherein, in the second thin film layers,
a thickness increment of the second thin film layers in the first wavelength reflection region is 0.36~0.56, and
a thickness increment of the second thin film layers in the second wavelength reflection region is 0.58~0.78.

5. The brightness enhancing film of claim 1, wherein, in the first thin film layers,
a thickness of each of the first thin film layers in the first wavelength reflection region is 22~61 nm,
a thickness of each of the first thin film layers in the second wavelength reflection region is 62~115 nm, and
a thickness of each of the first thin film layers in the third wavelength reflection region is determined by Equation 1 below, and is 116~143 nm:

$$y_x = ax^2 + bx + c \qquad \text{Equation 1}$$

wherein a is a real number of −0.0043~−0.0023, b is a real number of 1.75~1.95, c is a real number of −110~−90, x is an integer of 1 or more which shows a thin film layer, and $y_x$ is a thickness of a thin film layer corresponding to an $x^{th}$ layer.

6. The brightness enhancing film of claim 1, wherein, in the second thin film layers,
a thickness of each of the second thin film layers in the first wavelength reflection region is 40~69 nm,
a thickness of each of the second thin film layers in the second wavelength reflection region is 70~130 nm, and
a thickness of each of the second thin film layers in the third wavelength reflection region is determined by Equation 1 below, and is 132~162 nm:

$$y_x = ax^2 + bx + c \qquad \text{Equation 1}$$

wherein a is a real number of −0.0043~−0.0023, b is a real number of 1.75~1.95, c is a real number of −110~−90, x is an integer of 1 or more which shows a thin film layer, and $y_x$ is a thickness of a thin film layer corresponding to an $x^{th}$ layer.

7. The brightness enhancing film of claim 1, wherein the first thin film layers comprise a resin having 80 mol % or more of an ethylene naphthalate repeating unit.

8. The brightness enhancing film of claim 7, wherein the first thin film layers comprise a resin having 80~100 mol % of an ethylene naphthalate repeating unit and 0~20 mol % of an ethylene terephthalate repeating unit.

9. The brightness enhancing film of claim 1, wherein the second thin film layers comprise a resin having 10~60 mol % of an ethylene naphthalate repeating unit.

10. The brightness enhancing film of claim 9, wherein the second thin film layers comprise a resin having 10~60 mol % of an ethylene naphthalate repeating unit and 40~90 mol % of an ethylene terephthalate repeating unit.

* * * * *